United States Patent [19]

Yamaya et al.

[11] Patent Number: 4,847,311
[45] Date of Patent: Jul. 11, 1989

[54] POLYIMIDE RESIN COMPOSITION

[75] Inventors: Norimasa Yamaya; Nobuhito Koga; Kenichi Baba, all of Yokohama, Japan

[73] Assignee: Mitsui Toatsu Chemicals, Inc., Tokyo, Japan

[21] Appl. No.: 143,164

[22] PCT Filed: Apr. 8, 1987

[86] PCT No.: PCT/JP87/00218
§ 371 Date: Nov. 30, 1987
§ 102(e) Date: Nov. 30, 1987

[87] PCT Pub. No.: WO87/06251
PCT Pub. Date: Oct. 22, 1987

[30] Foreign Application Priority Data

Apr. 9, 1986 [JP] Japan .................. 61-80162
Apr. 28, 1986 [JP] Japan .................. 61-96652
May 6, 1986 [JP] Japan .................. 61-101932
May 14, 1986 [JP] Japan .................. 61-108513

[51] Int. Cl.$^4$ .................. C08K 7/14; C08K 7/06; C08K 7/02
[52] U.S. Cl. .................. 524/413; 524/600; 525/432
[58] Field of Search .......... 524/413, 600; 528/185; 525/432

[56] References Cited

U.S. PATENT DOCUMENTS 3,129,105 4/1964 Berry et al. ............. 524/413
3,830,777 8/1974 Burton .................. 524/413
4,535,101 3/1985 Lee et al. ............... 528/185
4,725,642 2/1988 Gannett et al. ........... 524/600

FOREIGN PATENT DOCUMENTS 47-017856 9/1972 Japan .
59-168030 9/1984 Japan .
59-050691 10/1984 Japan .

Primary Examiner—Lewis T. Jacobs
Attorney, Agent, or Firm—Fisher, Christen & Sabol

[57] ABSTRACT

This invention is a polyimide resin composition containing 100 parts by weight of polyimide having recurring units of the following general formula (I):

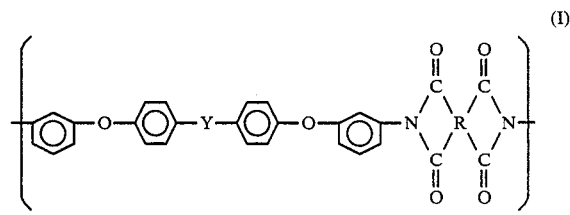

where Y is a bond, divalent hydrocarbon radical having from 1 to 10 carbons, hexafluorinated isopropylidene radical, carbonyl radical, thio radical, sulfinyl radical, sulfonyl radical or oxide, and R is a tetra-valent radical of aliphatic radical having 2 or more carbons, cyclic aliphatic radical, monocyclic aromatic radical, fused polycyclic radical and polycyclic aromatic radical wherein the aromatic radicals are linked to one another directly or via bridged member, and from 5 to 100 parts by weight of fibrous reinforcing materials such as glass fibres, carbon fibres, potassium titanate fibres and aromatic polyamide fibres. The resin composition can provide molded products having excellent high-temperature stability, dimensional stability and mechanical strength, and is useful as the material for electric and electronic devices, precision instrument parts etc.

Polyimide of this invention can be prepared from aromatic etherdiamined and taetracarboxylic acid dianhydrides. The aromatic etherdiamines are 4,4'-bis(3-aminophenoxy)biphenyl, 2,2-bis[4-(3-aminophenoxy)phenyl]propane, bis[4-(3-aminophenoxy)phenyl]sulfide, etc. The tetracarboxylic acid dianhydrides are pyromellitic dianhydride, 3,3',4,4'-benzophenonetetracarboxylic dianhydride, etc.

10 Claims, No Drawings

POLYIMIDE RESIN COMPOSITION

FIELD OF THE INVENTION

This invention relates to a novel polyimide resin composition having excellent high-temperature stability, dimensional stability and mechanical strength.

BACKGROUND OF THE INVENTION

Polyimide obtained by reacting tetracarboxylic acid dianhydride with diamine is hereafter expected for a wide use in areas where high-temperature stability is required, because of its various excellent properties and good thermal stability.

Many polyimides which have so far been developed exhibit excellent properties and yet they have an outstanding high-temperature stability accompanied by a poor processability. On the other hand the resin developed for improving the processability is inferior in the high-temperature stability and solvent resistance. Thus the performance of polyimide has both merits and drawbacks.

The object of this invention is to provide a novel polyimide resin composition having the excellent high-temperature stability, dimensional stability and mechanical strength.

DISCLOSURE OF THE INVENTION

The present inventors have investigate extensively to achieve the above object. Accordingly, they have found that a polyimide resin composition comprising polyimide and a specific amount of fibrous reinforcing materials is effective in particular. Thus the present invention has been completed.

That is, the present invention is a polyimide resin composition which comprises 100 parts by weight of polyimide having recurring units of the following formula (I):

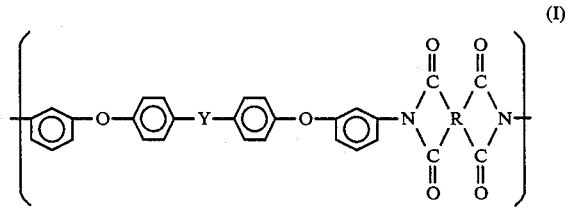
(I)

where Y is a radical selected from the group consisting of a bond, divalent hydrocarbon radical having from 1 to 10 carbons, hexafluorinated isopropylidene radical, carbonyl radical, thio radical, sulfinyl radical, sulfonyl radical or oxide, and R is a tetra-valent radical selected from the group consisting of aliphatic radical having 2 or more carbons, cyclic aliphatic radical, monocyclic aromatic radical, fused polycyclic radical and polycyclic aromatic radical wherein the aromatic radicals are linked to one another directly or via bridged member, and from 5 to 100 parts by weight of a fibrous reinforcing material.

Polyimide which is used in the present invention is prepared by conducting a dehydrating ring-closure of polyamic acid obtained by reacting an ether-diamine represented by the following formula (IV):

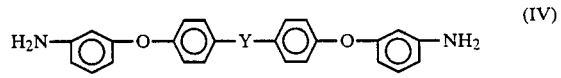
(IV)

where Y is a radical selected from the group consisting of a bond, divalent hydrocarbon radical having from 1 to 10 carbons, hexafluorinated isopropylidene radical, carbonyl radical, thio radical, sulfinyl radical, sulfonyl radical or oxide with a tetracarboxylic acid dianhydride represented by the following formula (V):

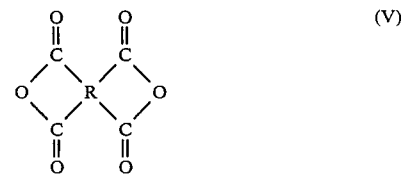
(V)

where R is a tetra-valent radical selected from the group consisting of aliphatic radical having 2 or more carbons, cyclic aliphatic radical, monocyclic aromatic radical, fused polycyclic radical and polycyclic aromatic radical wherein the aromatic radicals are linked to one another directly or via bridge member.

Ether-diamine in use for the method includes, for example, bis[4-(3-aminophenoxy)phenyl]methane, 1,1-bis[4-(3-aminophenoxy)phenyl]ethane, 1,2-[4-(3-aminophenoxy)phenyl]ethane, 2,2-bis[4-(3-aminophenoxy)phenyl]propane, 2,2-bis[4-(3-aminophenoxy)phenyl]butane, 2,2-bis[4-(3-aminophenoxy)phenyl]-1,1,1,3,3,3-hexafluoropropane, 4,4'-bis(3-aminophenoxy)biphenyl, bis[4-(3-aminophenoxy)phenyl] ketone, bis[4-(3-aminophenoxy)phenyl] sulfide, bis[4-(3-aminophenoxy)phenyl]sulfoxide, bis[4-(3-aminophenoxy)phenyl]sulfone and bis[4-(3-aminophenoxy)phenyl]ether. These diamine can be used alone or in mixtures of two or more.

Particularly preferred ether-diamine is 4,4'-bis-(3-aminophenoxy)biphenyl, 2,2-bis[4-(3-aminophenoxy)phenyl]propane and bis[4-(3-aminophenoxy)phenyl]sulfide.

Tetracarboxylic acid dianhydride used in the method includes, for example, ethylenetetracarboxylic dianhydride, cyclopentanecarboxylic dianhydride, pyromellitic dianhydride, 3,3',4,4'benzophenonetetra-carboxylic dianhydride, 2,2',3,3'-benzophenonebenzophenonetetracarboxylic dianhydride, 3,3',4,4'-biphenyltetracarboxylic dianhydride, 2,2',3,3'-biphenyltetracarboxylic dianhydride, 2,2-bis(3,4-dicarboxyphenyl)propane dianhydride, 2,2-bis(2,3-dicarboxyphenyl)propane dianhydride, bis(3,4-dicarboxyphenyl) ether dianhydride, bis(3,4-dicarboxyphenyl) sulfone dianhydride, 1,1-bis(2,3-dicarboxyphenyl)ethane dianhydride, bis(2,3-dicarboxyphenyl)methane dianhydride, bis(3,4-dicarboxyphenyl)methane dianhydride, 2,3,6,7-naphthalenetetracarboxylic dianhydride, 1,4,5,8-naphthalenetetracarboxylic dianhydride, 1,2,5,6-naphthalenetetracarboxylic dianhydride, 1,2,3,4-benzenetetracarboxylic dianhydride, 3,4,9,10-perylenetetracarboxylic dianhydride, 2,3,6,7-anthracenetetracarboxylic dianhydride and 1,2,7,8-phenanthrenetetracarboxylic dianhydride. Tetracarboxylic acid dianhydride can be used alone or in mixtures of two or more.

Particularly preferred tetracarboxylic acid dianhydride is pyromellitic dianhydride and 3,3',4,4'-benzophenonetetracarboxylic dianhydride.

The ether-diamine and tetracarboxylic acid dianhydride are ordinarily reacted by known procedures to give a polyamic acid having recurring units of the following formula (VI):

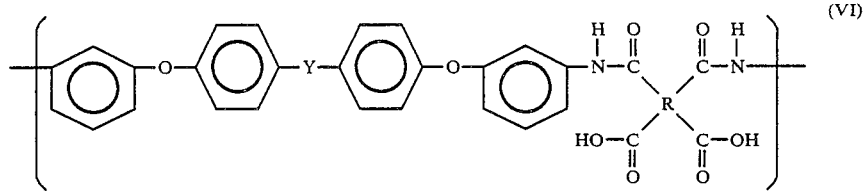

(where R is the same as above) and subsequently imidizing by a normal method to obtain polyimide having recurring units of the following formula (I):

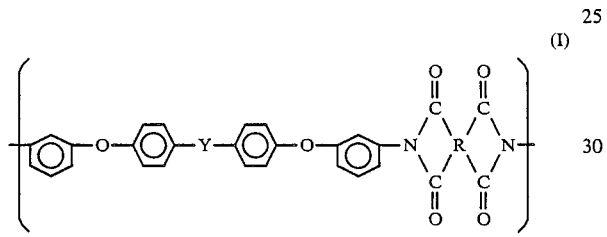

(where R is the same as above).

In the practice of the present invention, particularly preferred polyimide having recurring units of the above formula (I) includes:

(a) A polyimide having the above formula (I) wherein Y is a bond and R is represented by the following formula (II):

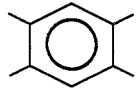

which is obtained by using 4,4'-bis(3-aminophenoxy)-biphenyl as the diamine and pyromellitic dianhydride as the tetracarboxylic acid dianhydride;

(b) A polyimide having the above formula (I) wherein Y is isopropylidene radical and R is represented by the following formula (III):

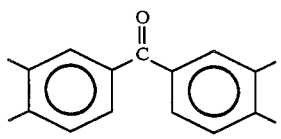

which is obtained by using 2,2-bis[4-(3-aminophenoxy)-phenyl]propane as the diamine and 3,3', 4,4'-benzophenonetetracarboxylic dianhydride as the tetracarboxylic acid dianhydride;

(c) A polyimide having the above formula (I) wherein Y is thio radical, R is represented by the following formula (II):

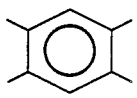

which is obtained by using bis[4-(3-aminophenoxy)-phenyl]sulfide as the diamine and pyromellitic dianhydride as the tetracarboxylic acid dianhydride; and (d) A polyimide having the above formula (I) wherein Y is thio radical and R is represented by the following formula (III):

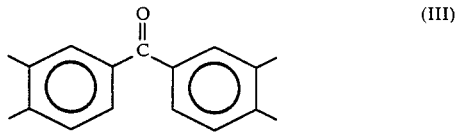

which is obtained using bis[4-(3-aminophenoxy)-phenyl]sulfide as the diamine and 3,3', 4,4'-benzophenonetetracarboxylic dianhydride as the tetracarboxylic acid dianhydride.

A variety of the fibrous reinforcing materials is used for the practice of this invention. The materials include, for example, glass fibre, carbon fibre, potassium titanate fibre, aromatic polyamide fibre, silicone carbide fibre, alumina fibre, boron fibre, and ceramic fibre. Particularly preferred fibres are glass fibre, carbon fibre, potassium titanate fibre and aromatic polyamide fibre.

The glass fibre used in the practice of this invention is made by various processes of quenching and drawing a molten glass to obtain a fine fibre having a predetermined diameter. The term glass fibre further includes strand prepared by bundling monofilaments with each other by a bundling agent and roving prepared by uniformly making parallel and bundling the strand. All of these materials can be used in this invention. In order to obtain affinity with the base resin of this invention, said glass fibre may be processed with surface-treating agents which include silane coupling agents such as aminosilane or epoxysilane, chromic chloride and other treating agents for various objects.

The length of the glass fibre of this invention has a remarkable effect on the properties of molded articles obtained and the workability in manufacturing such molded articles. When fibre length is increased, the properties of molded articles are generally improved, and yet, on the contrary, the workability in manufacturing becomes poor. Therefore the length of the glass fibre in the practice of this invention is preferably in the range of 0.1–6 mm, more preferably in the range of 0.3–4 mm, because both the properties of the molded articles and the workability in manufacturing are in a good balance.

Besides the carbon fibre used in the practice of this invention includes a high-modulus and high-strength fibre obtained by carbonizing primarily polyacrylonitrile, petroleum pitch and the like. Both acrylonitrile-based and petroleum pitch-based materials are suitable for this invention. The carbon fibre has a suitable diameter and a proper aspect ratio (ratio of length/diameter) on the basis of reinforcing effect and mixing ability. The diameter of carbon fibre is normally in the range of from 5 to 20 microns and preferably in the range of approximately from 8 to 15 microns in particular. The aspect ratio ranges normally from 1 to 600, preferably from about 100 to about 350 particularly according to the mixing ability and reinforcing effect. Too small aspect ratio has no reinforcing effect and excessive aspect ratio reduces mixing ability and inhibits to obtain good molded articles. Besides the surface of said carbon fibre may be processed with various treating agents which include, for example, epoxy resin, polyamide resin, polycarbonate resin, polyacetal resin and other known surface treating agents for a variety of objects.

In addition, the potassium titanate fibre of this invention is a type of high strength fibre (whisker) and a needle crystal having a chemical composition of fundamentally $K_2O \cdot 6TiO_2$, $K_2O \cdot 6TiO_2 \cdot \frac{1}{2}H_2O$ and a typical melting point of 1,300°–1,350° C. The fibre is applied in an average length of 5–50 microns and an average diameter of 0.05–1.0 micron, and preferably an average length of 20–30 microns and an average diameter of 0.1–0.3 micron. Although said potassium titanate fibre may normally be used in an untreated state, it may also be surface treated in order to have the affinity with the base resin of this invention. The silane coupling agents such as aminosilane and epoxysilane, chromic chloride and other surface treating agents may be used according to the objects.

Furthermore, the aromatic polyamide fibre used in the practice of this invention is a relatively new organic fibre developed for high-temperature stability and expected for use in a wide field by applying its unique characteristics. Typical examples of the resin include those having the following chemical structures. These resin can be used alone or a combination of two and more.

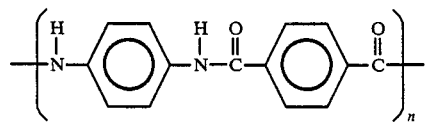

(1)

Example: Trade Mark; Kevler, from E. I. du Pont de Nemours & Co.

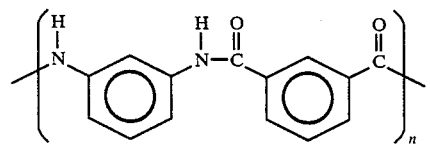

(2)

Example: Trade Mark; Nomex, from E. I. du Pont de Nemours & Co. Trade Mark; Conex, from TEIJIN

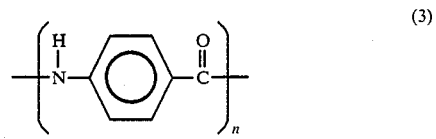

(3)

There are many other aromatic polyamide fibres having various polymer chains according to ortho-, meta-, or para-isomeric structure. Among them, the type (1) resin having para-para located linkages exhibits high softening point and melting point and is the most preferable in this invention as the high-temperature stable organic fibre.

The fibrous reinforcing material of this invention can be used in an amount of 5–100 parts by weight, preferably 10–50 parts by weight per 100 parts by weight of the polyimide. As to the glass fibre and the carbon fibre, the amount of less than 5 parts by weight can not afford the characteristic reinforcing effect of this invention which is specific in the glass fibre or the carbon fibre. On the other hand, the use of more than 100 parts by weight decreases flowability of the composition during the molding and it becomes difficult to obtain satisfactory articles.

The potassium titanate fibre can be used in an amount of 5–200 parts by weight, preferably 10–100 parts by weight per 100 parts by weight of the polyimide fibre. The amount of less than 5 parts by weight can not sufficiently improve the mechanical properties in high-temperature which are characteristics of this invention. On the contrary, the use of more than 200 parts by weight is undesirable because insufficient dispersion occurs in the molten mixing, the flowability decreases and the molding under normal conditions becomes difficult.

The aromatic polyamide fibre can be used in an amount of 5–100 parts by weight, preferably 10–50 parts by weight per 100 parts by weight of the polyimide resin. The amount of less than 5 parts by weight can not afford an excellent composition in the moldability and mechanical strength which are characteristics of this invention. On the other hand, the use of more than 100 parts by weight remarkably improves the flowability of the composition in molding. Heat-distortion temperature, however, drops and thus satisfactory high-temperature stability can not be obtained.

The polyimide composition in the practice of this invention can be prepared by the usually known methods and preferably by the following methods in particular.

(1) The polyimide powder and the fibrous reinforcing material are premixed by using a mortar, Henshel mixer, drum blender, tumbler blender, ball mill, ribbon blender etc. The resultant mixture is then kneaded with an usually known fusion mixer or hot roll to form pellets or powder.

(2) The polyimide powder is dissolved or suspended in organic solvents in advance. The fibrous reinforcing material is dipped in the resultant solution or suspension and then the solvents are removed in a hot air oven. The residual mass is pelletized or powdered.

The organic solvents used in this method include, for example, N,N-dimethylformamide, N,N-dimethylacetamide, N,N-diethylacetamide, N,N-dimethyl-methoxyacetamide, N-methyl-2-pyrrolidone, 1,3-dimethyl2-imidazolidinone, N-methylcaprolactam, 1,2-dimethoxyethane, bis(2-methoxyethyl) ether, 1,2-bis(2-methoxyethoxy)ethane, bis[2-(2-methoxyethoxy)ethyl]ether, tetrahydrofuran, 1,3-dioxane, 1,4-dioxane, pyridine, picoline, dimethyl sulfoxide, dimethyl sulfone, tetramethylurea and hexamethylphosphoramide. These solvents can be used alone or in mixtures of two or more.

(3) The polyamic acid precursor of polyimide of this invention having recurring units of the formula (VI) is dissolved in the afore-mentioned organic solvents. The fibrous reinforcing material is impregnated in the resultant solution and followed by subjecting to a heat treatment at a temperature of 100°–400° C. or a chemical imidization with an usually available imidizing agent. The solvents are then remove and the residue is pelletized or powdered.

Besides at least one of antioxidants, heat stabilizers, ultra violet absorbers, flame retardants, antistatic agents, lubricants, colorants and other ordinary additives may be added to the composition of this invention in a quantity of not rendering the object of this invention invalid.

Other materials which may be blended in a proper amount depending upon the object include thermoplastic resin (for example, polyethylene, polypropylene, polyamide, polycarbonate, polysulfone, polyethersulfone, polyetheretherketone, modified polyphenylene oxide, polyphenylene sulfide and the like), thermosetting resin (for example, phenolic resin, epoxy resin and the like) and fillers such as clay, mica, silica, graphite, glass beads, alumina, calcium carbonate etc.

The polyimide resin of this invention may be molded by known processing methods such as injection molding, extrusion molding, compression molding, rotation molding etc. and used for practical application.

EXAMPLES

The present invention will be hereinafter illustrated with respect to Synthetic examples, Specific examples and Comparative examples.

SYNTHETIC EXAMPLE 1

A 3 liter glass reaction vessel was charged with 186 grams (1.0 mol) of 4,4'-dihydroxybiphenyl, 438 grams (2.6 mols) of m-dinitrobenzene, 363 grams of potassium carbonate and 2,000 ml of N,N-dimethylformamide. The mixture was reacted at a temperature of 145°–150° C. for 16 hours. After completing the reaction, the resultant mixture was cooled and filtered to remove potassium nitrite. The solvent was distilled off from the filtrate under reduced pressure. The residue was cooled to 65° C., added with 2,000 ml of methanol and stirred for an hour. The resulted crystals were filtered, washed with water, washed with methanol and dried to obtain 426 grams (99.5% yield) of 4,4'-bis(3-nitrophenoxy)-biphenyl as brown crystals.

In the next step, a 1 l glass reaction vessel was charged with 100 grams (0.23 mol) of crude 4,4'-bis(3-nitrophenoxy)biphenyl, 10 grams of active carbon, 1 grams of ferric chloride hexahydrate and 500 ml of 2-methoxyethanol. The mixture was stirred for 30 minutes under reflux and then added dropwise with 46 grams (0.92 mol) of hydrazine hydrate during 3 hours at 70°–80° C. The reaction was terminated by stirring for 5 hours at 70°–80° C. after ending the dropwise addition. The reaction mixture was cooled, filtered to remove the catalyst and poured into 500 ml of water. The separated crystals were filtered, added with 48 grams of 35% hydrochloric acid and 540 ml of 50% isopropyl alcohol and warmed. The solution thus obtained was allowed to cool. The separated 4,4'-bis(3-aminophenoxy)biphenyl hydrochloride was filtered, added with 540 ml of 50% isopropyl alcohol and warmed. The solution thus obtained was added with 5 grams of active carbon, filtered and neutralized with aqueous ammonia. The separated crystals were filtered, washed with water and dried to give 72.0 grams (85% yield) of 4,4'-bis(3-aminophenoxy)biphenyl as colorless crystals having a melting point of 144°–146° C. The purity was 99.6% according to high-speed liquid chromatography.

Elementary analysis : $C_{24}H_{20}N_2O_2$

|  | C | H | N |
|---|---|---|---|
| Calculated (%) | 78.26 | 5.43 | 7.61 |
| Found (%) | 78.56 | 5.21 | 7.66 |

MS : 368 (M+): 340, 184.

IR $(KBr.cm^{-1})$ : 3400 and 3310 (amino group), 1240 (ether linkage).

SYNTHETIC EXAMPLE 2

A 1 liter glass reaction vessel was charged with 85.6 grams (0.375 mol) of 2,2-bis(4-hydroxyphenyl)propane, 151.2 grams (0.9 mol) of m-dinitrobenzene, 124.6 grams of potassium carbonate and 660 ml of N,N-dimethylformamide. The mixture was reacted for 10 hours at a temperature of 145°–150° C. After completing the reaction, the resultant mixture was cooled and filtered to remove potassium nitrite. The solvent was distilled off from the filtrate under reduced pressure. The residue was cooled to 65° C., added with 450 ml of methanol and stirred for an hour. The resulted crystals were filtered, washed with water, washed with methanol, and dried to obtain 164.8 grams (93.5% yield) of 2,2-bis[4-(3-nitrophenoxy)phenyl]propane as yellow brown crystals.

In the next step, a 500 ml glass reaction vessel was charged with 100 grams (0.21 mol) of 2,2-bis[4-(3-nitrophenoxy)phenyl]propane, 10 grams of active carbon, 1 gram of ferric chloride hexahydrate and 300 ml of 2-methoxyethanol. The mixture was stirred for 30 minutes under reflux and then added dropwise with 42 grams (0.84 mol) of hydrazine hydrate during 2 hours at 70°–80° C. The reaction mixture was further stirred for 5 hours at 70°–80° C., cooled, filtered to remove the catalyst, and 150 ml of 2-methoxyethanol was distilled off. The residue thus obtained was added with 270 grams of 20% aqueous hydrochloric acid solution and further 30 grams of sodium chloride, and cooled to 20°–25° C. with stirring. The separated crystals were filtered and neutralized in 30% isopropyl alcohol with aqueous ammonia. Thus separated crystals were filtered, washed with water, dried and recrystallized from a solvent mixture of benzene and n-hexane.

2,2-Bis[4-(3-aminophenoxy)phenyl]propane thus obtained was 69.2 grams (75% yield) and was colorless crystals having a melting point of 106°–108° C. The purity was 99.5% according to high-speed liquid chromatography.

Elementary analysis : $C_{27}H_{26}N_2O_2$

|  | C | H | N |
|---|---|---|---|
| Calculated (%) | 79.02 | 6.34 | 6.83 |
| Found (%) | 79.21 | 6.40 | 6.71 |

MS: 470 (M+): 455 (M—Ch3)+

IR (KBr.cm$^{-1}$): 3460 and 3370 (amino group), 1220 (ether linkage)

SYNTHETIC EXAMPLE 3

A 3 liter glass reaction vessel was charged with 218 grams (1 mol) of bis(4-hydroxyphenyl) sulfide, 403 grams (2.4 mols) of m-dinitrobenzene, 331 grams (2.4 mols) of potassium carbonate and 2.5 l of N,N-dimethylformamide. The mixture was reacted for 20 minutes at a temperature of 145°–150° C. After completing the reaction, the resultant mixture was cooled, filtered and the solvent was distilled from the filtrate under reduced pressure. The residue thus obtained was cooled to 65° C., added with 800 ml of methanol and stirred for an hour. The crystals obtained was filtered, washed with methanol and dried to give 429 grams (92.3% yield) of bis[4-(3-nitrophenoxy)phenyl]sulfide as crystals.

In the next step, 428 grams (0.93 mol) of the crude intermediate was charged in a 3 l glass reaction vessel and added with 22.6 grams of active carbon, 0.9 gram of ferric chloride hexahydrate and 1.5 l of 2-methoxyethanol. The mixture was stirred for 30 minutes under reflux, and then 115.2 grams (3.1 mols) of hydrazine hydrate was added dropwise during 2 hours at 110°–115° C. The resultant mixture was further stirred for 3.5 hours under reflux, cooled and filtered to remove the catalyst. The filtrate was concentrated under reduced pressure and added with 205 ml of 35% hydrochloric acid, 1,120 ml of water and 480 ml of isopropyl alcohol. The mixture was warmed to obtain a solution, added with 20 grams of active carbon and hot filtered. The filtrate was then added with 112 grams of sodium chloride, cooled and separated hydrochloride crystals were filtered. The hydrochloride crystals were neutralized with aqueous ammonia by a normal procedure to obtain 265 grams (66% yield) of desired bis[4-(3-aminophenoxy)phenyl]sulfide as colorless crystals having a melting point of 112°–113° C. (corr.). The purity was higher than 99.9%.

Elementary analysis : $C_{24} H_{20} N_2 O_2 S$

|  | C | H | N | S |
|---|---|---|---|---|
| Calculated (%) | 71.97 | 5.03 | 7.00 | 8.01 |
| Found (%) | 71.90 | 4.54 | 6.92 | 7.72 |

MS (FD) 400 (M$^+$)
IR (KBr.cm$^{-1}$) : 3390 and 3300 (amino group), 1220 (ether linkage)

EXAMPLES 1–6

A reaction vessel equipped with a stirrer, reflux condenser and nitrogen inlet tube was charged with 36.8 kilograms (100 mols) of 4,4'-(3-aminophenoxy)biphenyl and 175.8 kilograms of N,N-dimethylacetamide. The mixture was added by portions with 21.8 kilograms (100 mols) of pyromellitic dianhydride at room temperature under nitrogen atmosphere with care to prevent temperature rise of the mixture, and stirred for about 20 hours at room temperature. The polyamic acid thus obtained had an inherent viscosity of 2.47 dl/g. The inherent viscosity is a value measured at 35° C. in a concentration of 0.5 gram of sample/100 ml of solvent by use of N,N-dimethylacetamide as the solvent.

In the next step 150 kilograms of above polyamic acid solution was added with 337.5 kilograms of N,N-dimethylacetamide, warmed to 70° C. with stirring under nitrogen atmosphere, and added dropwise with 26.1 kilograms (26 mols) of acetic anhydride and 9.05 kilograms (9 mols) of triethylamine. Yellow polyimide powder was started to separate about 10 minutes after ending the dropwise addition, further stirred for 2 hours under warming, and then hot filtered. The polyimide powder thus obtained was washed with methanol and dried at 150° C. for 5 hours under reduced pressure to afford 34.5 kilograms (98% yield) of polyimide powder.

To 100 parts by weight of the polyimide powder above obtained, a silane treated glass fibre having 3 mm in length and 13 microns in diameter (Trade Mark; CS-3PE-476S, from Nitto Boseki) was added in an amount illustrated in Table 1 and mixed in a drum blender (from Kawata Seisakusho). The resultant mixture was kneaded in a molten state at a temperature of 390° C. in a single screw extruder having 30 mm in aperture. The strand thus formed was air cooled and cut into pellets.

The pellets obtained were injection molded with an Arburg injection molding machine having a maximum mold clamping force of 35 tons under conditions; injection pressure of 500 kg/cm$^2$, cylinder temperature of 400° C. and mold temperature of 180° C. Specimens for various tests were thus prepared and measured. The results are illustrated in Table 1. The following physical properties were measured in accordance with ASTM Testing methods.

| Tensile strength | ASTM | D-638 |
|---|---|---|
| Flexural modulus | ASTM | D-790 |
| Flexural strength | ASTM | D-790 |
| Notched Izod impact strength | ASTM | D-256 |
| Heat distortion temperature | ASTM | D-648 |
| Molding shrinkage | ASTM | D-955 |

EXAMPLE 7

To 100 parts by weight of the polyimide powder obtained by the same procedure as in Example 1, 150 parts by weight of N,N-dimethylacetamide were added to make a suspension. The suspension was further added and uniformly dispersed with 30 parts by weight of a silane treated glass fibre having a length of 3 mm and diameter of 13 microns (Trade Mark; CS-3PE-476S, from Nitto Boseki). After preliminary drying the resultant mixture in a hot air oven at 200° C. for 20 hours, it was dried in a vacuum desiccator at 150° C. for 5 hours under reduced pressure in order to completely remove the solvent. The polyimide impregnated glass fibre powder thus obtained was pelletized and injection molded by the same procedure as in Examples 1–6 to obtain specimens for testing the physical properties. The physical properties were tested by the same procedure as in Examples 1–6 and the results are illustrated in Table 2.

EXAMPLES 8

To 400 parts by weight of the polyamic acid solution obtained by the same procedure as in Example 1, 30 parts by weight of the same glass fibre as used in Examples 1–6 were dipped. Then the procedure of Example 7 was repeated to obtain a polyimide impregnated glass fibre powder. The powder was processed by the same procedure as in Example 7 and the results are illustrated in Table 2.

EXAMPLES 9-11 AND COMPARATIVE EXAMPLES 1-3

To 100 parts by weight of the polyimide powder derived from the diamine and tetracarboxylic dianhydride which are illustrated in Table 2, the same glass fibre as used in Examples 1-6 was added in an amount illustrated in Table 2. The same procedures as in Examples 1-6 were carried out to obtain results in Table 2.

In addition, the results obtained by using the glass fibre in an amount outside the scope of this invention are also illustrated in Table 3 as Comparative examples.

30 mm. The strand thus formed was air cooled and cut into pellets.

The pellets obtained were injection molded with an Arburg injection molding machine having a maximum mold clamping force of 35 tons under conditions; injection pressure of 500 kg/cm$^2$, cylinder temperature of 400° C. and mold temperature of 180° C. Specimens for various tests were prepared and measured. The results illustrated in Table 4 are tensile strength, flexural modulus, flexural strength, notched Izod impact strength, heat distortion temperature and molding shrinkage.

EXAMPLE 18

TABLE 1

| Example | Resin composition (parts by weight) Resin 100 Diamine | Dianhydride | Glass fibre | Tensile strength kg/cm$^2$ | Flexural strength kg/cm$^2$ | Flexural modulus kg/cm$^2$ | Izod impact strength (notched) Kg. cm/cm | Heat distortion temperature (18.6 Kg/cm$^2$) °C. | Molding shrinkage % |
|---|---|---|---|---|---|---|---|---|---|
| 1 | Biphenyl (1) | Pyromellit (2) | 10 | 1,300 | 2,100 | 46,000 | 12.0 | 238 | 0.3 |
| 2 | " | " | 20 | 1,560 | 2,390 | 50,000 | 14.5 | 244 | 0.2 |
| 3 | " | " | 30 | 1,740 | 2,520 | 84,900 | 17.2 | 246 | 0.2 |
| 4 | " | " | 40 | 1,840 | 2,700 | 101,000 | 20.0 | 249 | 0.2 |
| 5 | " | " | 50 | 1,900 | 2,780 | 115,000 | 21.9 | 252 | 0.2 |
| 6 | " | " | 80 | 1,720 | 2,600 | 110,500 | 21.0 | 250 | 0.2 |

Note:
(1) 4,4'-Bis(3-aminophenoxy)biphenyl
(2) Pyromellitic dianhydride

TABLE 2

| Example | Resin composition (parts by weight) Resin 100 Diamine | Dianhydride | Glass fibre | Tensile strength kg/cm$^2$ | Flexural strength kg/cm$^2$ | Flexural modulus kg/cm$^2$ | Izod impact strength (notched) Kg. cm/cm | Heat distortion temperature (18.6 Kg/cm$^2$) °C. | Molding shrinkage % |
|---|---|---|---|---|---|---|---|---|---|
| 7 | Biphenyl (1) | Pyromellit (4) | 30 | 1,650 | 2,500 | 85,000 | 18.0 | 246 | 0.2 |
| 8 | " | " | 30 | 1,680 | 2,600 | 85,500 | 17.2 | 245 | 0.2 |
| 9 | Propane (2) | Benzophenone (5) | 30 | 1,720 | 2,570 | 84,800 | 18.0 | 245 | 0.2 |
| 10 | Sulfide (3) | Pyromellit | 30 | 1,700 | 2,450 | 85,000 | 16.5 | 247 | 0.2 |
| 11 | " | Benzophenone | 30 | 1,690 | 2,520 | 85,200 | 17.0 | 246 | 0.2 |

Notes:
(1) 4,4'-Bis(3-aminophenoxy)biphenyl
(2) 2,2-Bis[4-(3-aminophenoxy)phenyl]propane
(3) Bis[4-(3-aminophenoxy)phenyl]sulfide
(4) Pyromellitic dianhydride
(5) 3,3', 4,4'-Benzophenonetetracarboxylic dianhydride

TABLE 3

| Comparative example | Resin composition (parts by weight) Resin 100 Diamine | Dianhydride | Glass fibre | Tensile strength kg/cm$^2$ | Flexural strength kg/cm$^2$ | Flexural modulus kg/cm$^2$ | Izod impact strength (notched) Kg · cm/cm | Heat distortion temperature (18.6 Kg/cm$^2$) °C. | Molding shrinkage % |
|---|---|---|---|---|---|---|---|---|---|
| 1 | Biphenyl (1) | Pyromellit (2) | 0 | 1,100 | 1,520 | 30,100 | 9.5 | 230 | 0.7 |
| 2 | " | " | 3 | 1,190 | 1,690 | 34,500 | 10.0 | 232 | 0.5 |
| 3 | " | " | 120 | Strand extrusion impossible | | | | | |

Note:
(1) 4,4'- Bis(3-aminophenoxy)biphenyl
(2) Pyromellitic dianhydride

EXAMPLES 12-17

To 100 parts by weight of the polyimide powder obtained by the same procedure as in Example 1, the carbon fibre having an average diameter of 12 microns, length of 3 mm and aspect ratio of 250 (Trade Mark; Torayca, from Toray Industries) was added in an amount illustrated in Table 4. After mixing in a drum blender (from Kawata Seisakusho), the resultant mixture was kneaded in a molten state at a temperature of 390° C. in a single screw extruder having an aperture of To 100 parts by weight of the polyimide powder obtained by the same procedure as in Example 1, 150 parts by weight of N,N-dimethylacetamide were added to make a suspension. The suspension was further added and uniformly dispersed with 30 parts by weight of a carbon fibre having an average diameter of 12 microns, length of 3 mm and aspect ratio of 250 (Trade Mark; Torayca from Toray Industries). After preliminary drying in a hot air oven at 200° C. for 20 hours, the resultant mixture was dried in a vacuum desiccator at 150° C. for 5 hours under reduced pressure in order to completely remove the solvent. The polyimide impregnated carbon fibre powder thus obtained was pelletized and injection molded by the same procedure as in Examples 12–17 to obtain specimens for testing the physical properties. The physical properties were tested by the same procedure as in Examples 12–17 and the results are illustrated in Table 5.

EXAMPLE 19

To 400 parts by weight of the polyamic acid solution obtained by the same procedure as in Example 1, 30 parts by weight of the same carbon fibre as used in Examples 12–17 were dipped. Then the procedure of Example 18 was repeated to obtain a polyimide impregnated carbon fibre powder. The powder was processed by the same procedure as in Example 18 and the results are illustrated in Table 5.

In addition, the results obtained by using the carbon fibre in an amount outside the scope of this invention are also illustrated in Table 6 as Comparative examples.

0.2 micron and average length of 20 microns (Trade Mark; Tismo-D from Ohtsuka Chemicals) was added in an amount illustrated in Table 7 and mixed in a drum blender (from Kawata Seisakusho). The resultant mixture was kneaded in a molten state at a temperature of 390° C. in a single screw extruder having an aperture of 30 mm. The strand thus formed was air cooled and cut into pellets.

The pellets thus obtained were injection molded with an Arburg injection molding machine having a maximum mold clamping force of 35 tons under conditions; injection pressure of 500 kg/cm$^2$, cylinder temperature of 400° C. and mold temperature of 180° C. Specimens for various tests were prepared and measured. The specimen to measure the molding shrinkage is a plate having dimensions of 50×50×3 mm A film gate having a thickness of 1 mm is provided in a side of 50 mm. The flow direction of the molten material is indicated by MD (machine-direction) and the rectangular direction to that is indicated by TD (transverse-direction). Table

TABLE 4

| Example | Resin compostition (parts by weight) Resin 100 Diamine | Dianhydride | Carbon fibre | Tensile strength kg/cm$^2$ | Flexural strength kg/cm$^2$ | Flexural modulus kg/cm$^2$ | Izod impact strength (notched) Kg · cm/cm | Heat distortion temperature (18.6 Kg/cm$^2$) °C. | Molding shrinkage % |
|---|---|---|---|---|---|---|---|---|---|
| 12 | Biphenyl (1) | Pyromellit (2) | 10 | 1,370 | 2,250 | 47,200 | 11.7 | 240 | 0.3 |
| 13 | " | " | 20 | 1,720 | 2,520 | 52,600 | 12.5 | 246 | 0.2 |
| 14 | " | " | 30 | 1,860 | 2,680 | 86,200 | 17.6 | 247 | 0.2 |
| 15 | " | " | 40 | 1,920 | 2,820 | 115,000 | 19.5 | 251 | 0.2 |
| 16 | " | " | 50 | 1,960 | 2,830 | 123,600 | 20.5 | 252 | 0.2 |
| 17 | " | " | 80 | 1,980 | 2,890 | 121,000 | 20.5 | 251 | 0.2 |

Note;
(1) 4,4'-Bis(3-aminophenoxy)biphenyl
(2) Pyromellitic dianhydride

TABLE 5

| Example | Resin composition (parts by weight) Resin 100 Diamine | Dianhydride | Carbon fibre | Tensile strength kg/cm$^2$ | Flexural strength kg/cm$^2$ | Flexural modulus kg/cm$^2$ | Izod impact strength (notched) Kg. cm/cm | Heat distortion temperature (18.6 Kg/cm$^2$) °C. | Molding shrinkage % |
|---|---|---|---|---|---|---|---|---|---|
| 18 | Biphenyl (1) | Pyromellit (4) | 30 | 1,920 | 2,680 | 86,200 | 17.4 | 248 | 0.2 |
| 19 | " | " | 30 | 1,960 | 2,590 | 85,000 | 17.3 | 246 | 0.2 |
| 20 | Propane (2) | Benzophenone (5) | 30 | 1,960 | 2,540 | 85,200 | 17.9 | 249 | 0.2 |
| 21 | Sulfide (3) | Pyromellit | 30 | 1,870 | 2,690 | 86,300 | 17.2 | 247 | 0.2 |
| 22 | " | Benzophenone | 30 | 1,890 | 2,700 | 85,000 | 17.0 | 247 | 0.2 |

Note;
(1) 4,4'-Bis(3-aminophenoxy)biphenyl
(2) 2,2-Bis[4-(3-aminophenoxy)phenyl] propane
(3) Bis[4-(3-aminophenoxy)phenyl] sulfide
(4) Pyromellitic dianhydride
(5) 3,3', 4,4'-Benzophenonetetracarboxylic dianhydride

TABLE 6

| Comparative example | Resin composition (parts by weight) Resin 100 Diamine | Dianhydride | Carbon fibre | Tensile strength kg/cm$^2$ | Flexural strength kg/cm$^2$ | Flexural modulus kg/cm$^2$ | Izod impact strength (notched) Kg. cm/cm | Heat distorsion temperature (18.6 Kg/cm$^2$) °C. | Molding shrinkage % |
|---|---|---|---|---|---|---|---|---|---|
| 4 | Biphenyl (1) | Pyromellit (2) | 0 | 1,100 | 1,520 | 30,100 | 9.5 | 230 | 0.7 |
| 5 | " | " | 3 | 1,250 | 1,610 | 34,600 | 10.0 | 232 | 0.5 |
| 6 | " | " | 120 | Strand extrusion impossible | | | | | |

Note;
(1) 4,4'-Bis(3-aminophenoxy)biphenyl
(2) Pyromellitic dianhydride

EXAMPLES 23–27

To 100 parts by weight of the polyimide powder obtained by the same procedure as in Example 1, a potassium titanate fibre having a sectional diameter of 7 shows tensile strength, flexural modulus, flexural strength, notched Izod impact strength, heat distortion temperature and molding shrinkage.

EXAMPLE 28

To 100 parts by weight of the polyimide powder obtained by the same procedure as in Example 1, 150 parts by weight of N,N-dimethylacetamide were added to make a suspension. The suspension is further added and uniformly dispersed with 30 parts by weight of a potassium titanate fibre having a sectional diameter of 0.2 micron and average length of 20 microns (Trade Mark; Tismo-D, from Ohtsuka Chemicals). After preliminary drying in a hot air oven at 200° C. for 20 hours, the resultant mixture was dried in a vacuum desiccator at 150° C. for 5 hours under reduced pressure in order to completely remove the solvent. The polyimide impregnated potassium titanate fibre thus obtained was pelletized and injection molded by the same procedure as in Examples 23-27 to obtain specimens for testing the physical properties. The physical properties were examined by using these specimens and the results obtained are illustrated in Table 8.

EXAMPLE 29

To 400 parts by weight of the polyamic acid solution obtained by the same procedure as in Example 1, 30 parts by weight of the same potassium titanate fibre as used in Example 28 were dipped. Then the Procedure of Example 28 was repeated to obtain a polyimide impregnated potassium titanate fibre. The fibre was processed by the same procedure as in Example 28 and the results are illustrated in Table 8.

EXAMPLES 30-32 AND COMPARATIVE EXAMPLES 7-9

To 100 parts by weight of the polyimide powder derived from the diamine and tetracarboxylic acid dianhydride which are illustrated in Table 8, the same potassium titanate fibre as used in Examples 23-27 was added in an amount shown in Table 8. The same procedures as in Examples 23-27 were carried out to obtain the results illustrated in Table 8.

In addition, similar Comparative examples are illustrated in Table 9.

TABLE 7

| Examples | Resin composition (parts by weight) Resin 100 Diamine | Dianhydride | Potassium titanate fibre | Molding shrinkage % (1) MD | (2) TD | Tensile strength $Kg/cm^2$ (3) RT | 200° C. | Flexural strength $Kg/cm^2$ RT | 200° C. | Flexural modulus $Kg/cm^2$ RT | 200° C. | Izod impact strength (notched) (Kg. cm/cm) | Heat distortion temperature (18.6 $Kg/cm^2$) °C. |
|---|---|---|---|---|---|---|---|---|---|---|---|---|---|
| 23 | Biphenyl (4) | Pyromellit (5) | 10 | 0.4 | 0.8 | 1170 | 820 | 1590 | 1150 | 36200 | 9500 | 10.0 | 235 |
| 24 | " | " | 30 | 0.3 | 0.6 | 1260 | 835 | 1780 | 1220 | 45900 | 13500 | 10.7 | 241 |
| 25 | " | " | 50 | 0.3 | 0.5 | 1540 | 845 | 1980 | 1250 | 60200 | 16300 | 11.6 | 245 |
| 26 | " | " | 80 | 0.2 | 0.5 | 1690 | 890 | 2230 | 1270 | 79800 | 18400 | 12.5 | 249 |
| 27 | " | " | 100 | 0.2 | 0.4 | 1820 | 910 | 2370 | 1300 | 87000 | 19600 | 13.1 | 252 |

Note;
(1) Machine direction
(2) Transverse direction
(3) Room temperature
(4) 4,4'-Bis(3-aminophenoxy)biphenyl
(5) Pyromellitic dianhydride

TABLE 8

| Examples | Resin composition (parts by weight) Resin 100 Diamine | Dianhydride | Potassium titanate fibre | Molding shrinkage % (1) MD | (2) TD | Tensile strength $Kg/cm^2$ (3) RT | 200° C. | Flexural strength $Kg/cm^2$ RT | 200° C. | Flexural modulus $Kg/cm^2$ RT | 200° C. | Izod impact strength (notched) (Kg. cm/cm) | Heat distortion temperature (18.6 $Kg/cm^2$) °C. |
|---|---|---|---|---|---|---|---|---|---|---|---|---|---|
| 28 | Biphenyl (4) | Pyromellit (7) | 30 | 0.4 | 0.7 | 1250 | 840 | 1790 | 1250 | 43500 | 13500 | 10.6 | 244 |
| 29 | " | " | 30 | 0.3 | 0.6 | 1340 | 840 | 1760 | 1260 | 43000 | 13500 | 10.9 | 245 |
| 30 | Propane (5) | Benzophenone (8) | 30 | 0.3 | 0.7 | 1340 | 830 | 1780 | 1240 | 45900 | 12900 | 9.9 | 246 |
| 31 | Sulfide (6) | Pyromellit | 30 | 0.4 | 0.6 | 1260 | 835 | 1770 | 1240 | 46200 | 12800 | 10.7 | 244 |
| 32 | " | Benzophenone | 30 | 0.4 | 0.6 | 1310 | 840 | 1780 | 1250 | 45000 | 13600 | 10.7 | 245 |

Note;
(1) Machine direction
(2) Transverse direction
(3) Room temperature
(4) 4,4'-Bis(3-aminophenoxy)biphenyl
(5) 2,2-Bis(3-aminophenoxy)phenyl]propane
(6) Bis[4-(3-aminophenoxy)phenyl]sulfide
(7) Pyromellitic dianhydride
(8) 3,3', 4,4'-Benzophenone tetracarboxylic dianhydride

TABLE 9

| Examples | Resin composition (parts by weight) Resin 100 Diamine | Dianhydride | Potassium titanate fibre | Molding shrinkage % (1) MD | (2) TD | Tensile strength $Kg/cm^2$ (3) RT | 200° C. | Flexural strength $Kg/cm^2$ RT | 200° C. | Flexural modulus $Kg/cm^2$ RT | 200° C. | Izod impact strength (notched) (Kg. cm/cm) | heat distortion temperature (18.6 $Kg/cm^2$) °C. |
|---|---|---|---|---|---|---|---|---|---|---|---|---|---|
| 7 | Biphenyl (4) | Pyromellit (5) | 0 | 0.7 | 1.6 | 1100 | 460 | 1520 | 610 | 30100 | 2400 | 9.5 | 230 |
| 8 | " | " | 3 | 0.5 | 1.4 | 1150 | 510 | 1590 | 710 | 32000 | 3500 | 9.7 | 231 |

TABLE 9-continued

| | Resin composition (parts by weight) | | Potassium titanate fibre | Molding shrinkage % | | Tensile strength Kg/cm² | | Flexural strength Kg/cm² | | Flexural modulus Kg/cm² | | Izod impact strength (notched) (Kg. cm/cm) | heat distortion temperature (18.6 Kg/cm²) °C. |
|---|---|---|---|---|---|---|---|---|---|---|---|---|---|
| Examples | Resin 100 | | | (1) | (2) | (3) | | | | | | | |
| | Diamine | Dianhydride | | MD | TD | RT | 200° C. | RT | 200° C. | RT | 200°C. | | |
| 9 | " | " | 220 | Strand extrusion impossible | | | | | | | | | |

Note;
(1) Machine direction
(2) Transverse direction
(3) Room temperature
(4) 4,4'-Bis(3-aminophenoxy)biphenyl
(5) Pyromellitic dianhydride

EXAMPLES 33-38

To 100 parts by weight of the polyimide powder obtained by the same procedure as in Example 1, an aromatic polyamide fibre having an average length of 3 mm (Trade Mark; Kevlar, from E. I. du Pont de Nemours & Co.) was added in an amount illustrated in Table 10 and mixed in a drum blender (from Kawata Seisakusho). The resultant mixture was kneaded in a molten state at a temperature of 390° C. in a single screw extruder having an aperture of 30 mm. The strand thus formed was air cooled and cut into pellets.

The pellets thus obtained were injection molded with an Arburg injection molding machine having a maximum mold clamping force of 35 tons under conditions; injection pressure of 500 kg/cm², cylinder temperature of 400° C. and mold temperature of 180° C. Specimens for various tests were prepared and measured. Table 10 shows tensile strength, flexural modulus, flexural strength, notched Izod impact strength, heat distortion temperature and flowability.

Besides the test result on the flowability in molding is demonstrated by the spiral flow length having a width of 10 mm and thickness of 2.0 mm under the aforesaid injection molding conditions, that is, injection pressure of 500 kg/cm², cylinder temperature of 400° C. and mold temperature of 180° C.

EXAMPLE 39

To 100 parts by weight of the polyimide powder obtained by the same procedure as in Example 1, 150 parts by weight of N,N-dimethylacetamide were added to make a suspension. The suspension is further added and uniformly dispersed with 30 parts by weight of an aromatic polyamide fibre having an average length of 3 mm (Trade Mark; Kevlar, from E. I. du Pont de Nemours & Co.). After preliminary drying in a hot air oven at 200° C. for 20 hours, the resultant mixture was dried in a vacuum desiccator at 150° C. for 5 hours under reduced pressure in order to completely remove the solvent. The polyimide impregnated aromatic polyamide fibre powder thus obtained was pelletized and injection molded by the same procedure as in Examples 33-38 to obtain specimens for testing the physical properties. The physical properties were examined by using these specimens and the results obtained are illustrated in Table 11.

EXAMPLE 40

To 400 parts by weight of the polyamic acid solution obtained by the same procedure as in Example 1, 30 parts by weight of the same aromatic polyamide fibre as used in Examples 33-38 were impregnated.

The procedure of 39 was repeated to obtain the results illustrated in Table 11.

EXAMPLES 41-43 AND COMPARATIVE EXAMPLES 10-12

To 100 parts by weight of the polyimide power derived from the diamine and tetracarboxylic acid dianhydride which are illustrated in Table 11, the same aromatic polyamide fibre as used in Examples 33-38 was added in an amount shown in Table 11. The same procedures as in Examples 33-38 were carried out to obtain the results illustrated in Table 11.

In addition, similar Comparative examples are illustrated in Table 12.

TABLE 10

| | Resin composition (parts by weight) | | | Tensile strength kg/cm² | Flexural strength kg/cm² | Flexural modulus kg/cm² | Izod impact strength (notched) Kg. cm/cm | Heat distortion temperature (18.6 Kg/cm²) °C. | Spiral flow mm |
|---|---|---|---|---|---|---|---|---|---|
| | Resin 100 | | Aromatic polyamide fibre | | | | | | |
| Example | Diamine | Dianhydride | | | | | | | |
| 33 | Biphenyl (1) | Pyromellit (2) | 10 | 1,280 | 1,650 | 32,500 | 9.8 | 231 | 45 |
| 34 | " | " | 20 | 1,280 | 1,640 | 32,500 | 10.5 | 230 | 52 |
| 35 | " | " | 30 | 1,350 | 1,740 | 33,400 | 11.2 | 230 | 60 |
| 36 | " | " | 40 | 1,420 | 1,760 | 33,400 | 13.0 | 228 | 68 |
| 37 | " | " | 50 | 1,460 | 1,820 | 35,100 | 13.8 | 226 | 74 |
| 38 | " | " | 80 | 1,480 | 1,820 | 36,400 | 14.2 | 224 | 81 |

Note;
(1) 4,4'-Bis(3-aminophenoxy)biphenyl
(2) Pyromellitic dianhydride

TABLE 11

| | Resin composition (parts by weight) | | | Tensile strength kg/cm² | Flexural strength kg/cm² | Flexural modulus kg/cm² | Izod impact strength (notched) Kg. cm/cm | Heat distortion temperature (18.6 Kg/cm²) °C. | Spiral flow mm |
|---|---|---|---|---|---|---|---|---|---|
| | Resin 100 | | Aromatic poly-amide fibre | | | | | | |
| Example | Diamine | Dianhydride | | | | | | | |
| 39 | Biphenyl (1) | Pyromellit (4) | 30 | 1,280 | 1,700 | 33,500 | 10.9 | 229 | 60 |
| 40 | " | " | 30 | 1,280 | 1,740 | 33,500 | 10.1 | 230 | 58 |
| 41 | Propane (2) | Benzophenone (5) | 30 | 1,350 | 1,740 | 32,500 | 10.0 | 230 | 59 |
| 42 | Sulfide (3) | Pyromellit | 30 | 1,320 | 1,720 | 32,500 | 9.8 | 230 | 60 |
| 43 | " | Benzophenone | 30 | 1,280 | 1,690 | 33,400 | 9.9 | 230 | 60 |

Note;
(1) 4,4'-Bis(3-aminophenoxy)biphenyl
(2) 2,2-Bis[4-(3-aminophenoxy)phenyl]propane
(3) Bis[4-(3-aminophenoxy)phenyl] sulfide
(4) Pyromellitic dianhydride
(5) 3,3', 4,4'-Benzophenonetetracarboxylic dianhydride

TABLE 12

| | Resin composition (parts by weight) | | | Tensile strength kg/cm² | Flexural strength kg/cm² | Flexural modulus kg/cm² | Izod impact strength (notched) Kg. cm/cm | Heat distortion temperature (18.6 Kg/cm²) °C. | Spiral flow mm |
|---|---|---|---|---|---|---|---|---|---|
| Compara-tive example | Resin 100 | | Aromatic poly-amide fibre | | | | | | |
| | Diamine | Dianhydride | | | | | | | |
| 10 | Biphenyl (1) | Pyromellit (2) | 0 | 1,100 | 1,520 | 30,100 | 9.5 | 230 | 35 |
| 11 | " | " | 3 | 1,150 | 1,600 | 31,500 | 9.9 | 230 | 37 |
| 12 | " | " | 120 | 1,420 | 1,860 | 36,500 | 15.2 | 198 | 92 |

Note;
(1) 4,4'-Bis(3-aminophenoxy)biphenyl
(2) Pyromellitic dianhydride

POSSIBILITY FOR USE IN INDUSTRY

The polyimide resin composition of this invention has a high heat distortion temperature and further holds a high-temperature stability, dimensional stability and mechanical strength. Thus the composition is a useful material for electric and electronic devices, automotive parts and articles for precision instruments. Therefore the polyimide resin composition of this invention is very valuable in industry.

We claim:

1. A polyimide resin composition which comprises 100 parts by weight of a polyimide having recurring units of the formula (I):

(I)

where Y is a radical selected from the group consisting of a bond, divalent hydrocarbon radical having from 1 to 10 carbons, hexafluorinated isopropylidene radical, carbonyl radical, thio radical, sulfinyl radical, sulfonyl radical or oxide, and R is a tetra-valent radical selected from the group consisting of aliphatic radical having 2 or more carbons, cyclic aliphatic radical, monocyclic aromatic radical, fused polycyclic radical and polycyclic aromatic radical wherein the aromatic radicals are linked to one another directly or via bridged member, and from 5 to 100 parts by weight of a fibrous reinforcing material.

2. The polyimide resin composition as claimed in claim 1 wherein Y is isopropylidene radical.

3. The polyimide resin composition as claimed in claim 1 wherein Y is a bond and R is represented by the formula (II):

(II)

4. The polyimide resin composition as claimed in claim 1 or claim 2 wherein Y is isopropylidene radical and R is represented by the formula (III):

(III)

5. The polyimide resin composition as claimed in claim 1 wherein Y is thio radical and R is represented by the formula (II):

(II)

6. The polyimide resin composition as claimed in claim 1 wherein Y is thio radical and R is represented by the formula (III):

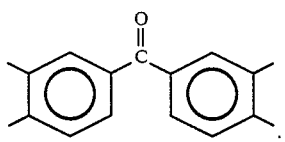 (III)

7. The polyimide resin composition as claimed in one of from claim 1 to claim 6 wherein the fibrous reinforcing material is a glass fibre.

8. The polyimide resin composition as claimed in one of from claim 1 to claim 6 wherein the fibrous reinforcing material is a carbon fibre.

9. The polyimide resin composition as claimed in one of from claim 1 to claim 6 wherein the fibrous reinforcing material is a potassium titanate fibre.

10. The polyimide resin composition as claimed in one of from claim 1 to claim 6 wherein the fibrous reinforcing material is an aromatic polyamide fibre.

* * * * *